Dec. 1, 1942.     E. L. ROSE     2,303,955
POWER TRANSMISSION
Original Filed March 28, 1936
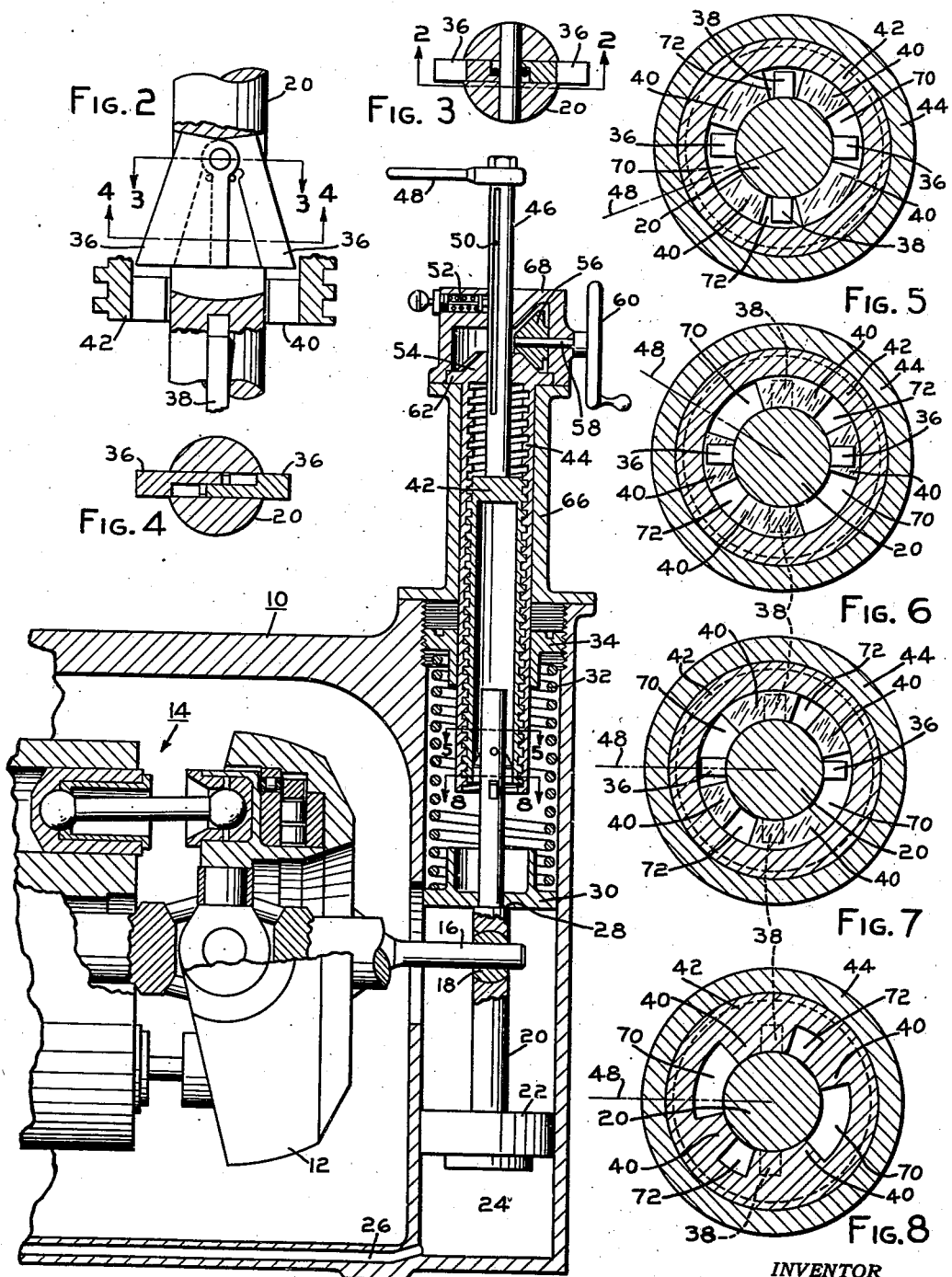
INVENTOR
EDWIN L. ROSE
BY *Ralph L. Tweedale*
ATTORNEY Patented Dec. 1, 1942

2,303,955

UNITED STATES PATENT OFFICE 2,303,955

POWER TRANSMISSION

Edwin L. Rose, Woodbury, Conn.

Original application March 28, 1936, Serial No. 71,419. Divided and this application November 29, 1940, Serial No. 367,823

6 Claims. (Cl. 103—162)

This invention relates to power transmissions, particularly to those of the type comprising two or more fluid pressure energy translating devices, one of which may function as a pump and another as a fluid motor.

The present application is a division of copending application Serial No. 71,419, filed March 28, 1936, now Patent No. 2,236,489.

The invention is particularly concerned with an improved displacement regulator for a variable displacement pump and which is particularly adapted for the control of a hydraulic power transmission system for driving an airplane crane winch of the type which provides for constant tension operation preliminary to picking a floating plane off from the water. It will be understood that the present control mechanism, although it is described in connection with such use, is also adapted for many other purposes where the control of pump displacement is required to be made selectively responsive either to the pump delivery pressure or to a manual controlling member.

It is an object of the present invention to provide a control device for a variable displacement pump in which the displacement may be varied either in response to working pressure to maintain a substantially constant pressure or may be controlled to maintain the pressure above a predetermined minimum and to provide manual control means for selectively transferring the control from one condition to the other.

A further object is to provide a control device of the character described wherein the pump displacement may be varied selectively either in response to pressure or may be varied by means of a manual control mechanism independently of pressure.

Further objects and advantages of the present invention will be apparent from the following description, reference being had to the accompanying drawing wherein a preferred form of the present invention is clearly shown.

In the drawing:

Figure 1 is a fragmentary sectional view of a pump and control mechanism incorporating a preferred form of the present invention.

Figure 2 is a fragmentary sectional view of a latch mechanism taken on line 2—2 of Figure 1.

Figure 3 is a fragmentary sectional view taken on line 3—3 of Figure 2.

Figure 4 is a fragmentary sectional view taken on line 4—4 of Figure 2.

Figure 5 is a fragmentary sectional view taken on line 5—5 of Figure 1 showing the parts in one position.

Figure 6 is a view corresponding to Figure 5 showing the parts in a second position.

Figure 7 is a view corresponding to Figure 5 showing the parts in a third position.

Figure 8 is a fragmentary cross section taken on line 8—8 of Figure 1.

Referring now to Figure 1, the pump generally designated 10 is provided with a tilting box 12 mounted upon the usual horizontal trunnions for tilting movement to vary the displacement of the pump and the direction of fluid delivery. The usual rotating drive shaft, universal joint, socket rings, connecting rods, pistons, and cylinder barrel constitute the customary revolving group generally designated as 14 and representing the conventional internal construction of the well-known Waterbury type of variable displacement pump.

Referring now to Figures 1 through 8, inclusive, the control mechanism for the pump 10 is illustrated. The tilting box 12 carries an operating stud 16 to which is connected by means of a sliding and pivoting joint 18 a vertically slidable operating stem 20. The lower end of the stem 20 is formed with a piston 22 slidable in a cylinder bore 24 which is in communication with the pressure conduit of the pump through a passage 26 formed in the casing of the pump. The stem 20 is formed with a shoulder 28 against which a spring plate 30 abuts. A spring 32 has its lower end abutting the spring plate 30 and its upper end abutting a spring plate 34 adjustably secured to the pump casing. The stem 20 projects through the spring plate 30 and carries two sets of yieldable latches 36 and 38 (see Figs. 2, 3 and 4). The latches 36 and 38 are disposed at right angles to one another and vertically spaced so that the latches 36 may engage the upper side of a ledge 40 while the latches 38 may engage the lower side thereof. The ledge 40 is formed integrally with a tubular member 42, the outside of which is screw threaded for engagement with an interiorly threaded sleeve 44.

The tubular member 42 carries an upwardly projecting stem 46 having an operating handle 48 at its upper end. The stem 46 is formed with three longitudinal grooves 50 by which it may be locked in any one of three angularly spaced positions by means of a spring-pressed, manually operable detent 52. The sleeve 44 carries a bevel gear 54 at its upper end which meshes with a bevel gear 56 carried by a shaft 58 which may be operated by a hand wheel 60. A flange 62 which is rotatably mounted between a supporting sleeve 66 and a cover member 68 restrains the sleeve 44 against vertical movement.

The ledge 40 is interrupted at points 70 and 72 (see Fig. 8) in order to permit the latches 36 and 38 to pass the ledge in either direction of movement in certain positions of the operating handle 48. Thus, in the position illustrated in Figure 5 which may be called the constant tension position, both the latches 36 and 38 are opposite the portions 70 and 72, respectively, so that the stem 20 may reciprocate freely through its full range of movement. In the position illustrated in Figure 6 which may be termed the manual control position, both the latches 36 and 38 are opposite portions of the ledge 40 so that the tubular member 42 may be rigidly secured to the stem 20. In the position illustrated in Figures 7 and 8 which may be termed the pick-up position, the interrupted portions 70 are in register with the latches 36 while portions of the ledge 40 are in register with the latches 38. In this position the stem 20, after it has once moved the latches 38 downwardly past the ledge 40, is prevented from moving upwardly again beyond the point where the latches 38 engage the bottom of the ledge 40 although the stem 20 is free to move downwardly from this position at any time.

It will be seen that in the constant tension position of the handle 48, the position of the tilting box 12 is under the sole control of the piston 22 and the spring 32. In the manual control position of the handle 48, the position of the tilting box 12 once the latches 36 and 38 have been engaged with the ledge 40 is under the sole control of the hand wheel 60. In the pick-up position the movement of the tilting box upwardly is limited by the position of the ledge 40 so long as the working pressure of the pump is sufficient to overcome the force of the spring 32 and hold the latches 38 in engagement with the ledge 40. Upon a drop in pressure below this point, the position of the tilting box is determined by the pressure through the medium of the piston 22 and the spring 32.

It will be noted that if the handle 48 is turned from constant tension position to pick-up position at an instant when the latches 38 are above the ledge 40 that the tilting box remains under the control of the piston 22 and spring 32 until such time as the stem 20 has moved downwardly to bring the latches 38 beneath the ledge 40 and has again started upwardly to engage the latches 38 with the ledge 40.

While the form of embodiment of the invention as herein disclosed constitutes a preferred form, it is to be understood that other forms might be adopted, all coming within the scope of the claims which follow.

What is claimed is as follows:

1. A control device for a variable displacement pump comprising in combination means for varying the displacement of the pump, automatic means responsive to the working pressure in the pump for operating the displacement varying means, means for limiting the operation of the automatic means to a selected displacement range, manually operable means for selectively rendering the limiting means effective or ineffective, and additional means for operating the displacement varying means independently of the working pressure of the pump.

2. A control device for a variable displacement pump comprising in combination means for varying the displacement of the pump, automatic means responsive to the working pressure in the pump for operating the displacement varying means, means for limiting the operation of the automatic means to a selected displacement range, manually operable means for selectively rendering the limiting means effective or ineffective, and additional means for operating the displacement varying means independently of the working pressure of the pump, said last-named means including mechanism operable to vary the range of displacement through which the automatic means is operable when the limiting means is effective.

3. A control device for a variable displacement pump comprising in combination a movable member for varying the displacement of the pump, automatic means responsive to the working pressure in the pump for operating the displacement varying means, means including a stop engageable with said member for limiting the operation of the automatic means to a selected displacement range, manually operable means for selectively rendering the limiting means effective or ineffective, and additional means for operating the displacement varying means through said stop.

4. A control device for a variable displacement pump comprising in combination a movable member for varying the displacement of the pump, automatic means responsive to the working pressure in the pump for operating the displacement varying means, means including a stop engageable with said member for limiting the operation of the automatic means to a selected displacement range, manually operable means for selectively rendering the limiting means effective or ineffective, and additional means for operating the displacement varying means through said stop independently of the working pressure of the pump, said last-named means including mechanism operable to vary the range of displacement through which the automatic means is operable when the limiting means is effective.

5. A control device for a variable displacement pump comprising in combination a movable member for varying the displacement of the pump, automatic means responsive to the working pressure in the pump for operating the displacement varying means, means including a latch mechanism and a keeper mechanism, one of which is carried by the member and the other of which is engageable with the one carried by said member for limiting the operation of the automatic means to a selected displacement range, and manually operable means to shift one of said mechanisms into and out of the path of the other mechanism on said member, whereby the movable member is free to move throughout its full range after the last means is shifted to a range-limiting position and until it moves into the limited range under the action of the automatic means.

6. A control device for a variable displacement pump comprising in combination a movable member for varying the displacement of the pump, automatic means responsive to the working pressure in the pump for operating the displacement varying means, means including a latch mechanism and a keeper mechanism, one of which is carried by the member and the other of which is engageable with the one carried by said member for limiting the operation of the automatic means to a selected displacement range, manually operable means to shift one of said mechanisms into and out of the path of the other mechanism on said member, whereby the movable member is free to move throughout its full range after the last means is shifted to a range-limiting position and until it moves into the limited range under the action of the automatic means, and additional means for operating the displacement varying means including a second latch mechanism engageable with said keeper mechanism and coacting with the first latch mechanism to provide a rigid connection with the movable member.

EDWIN L. ROSE.